United States Patent [19]

Manning

[11] Patent Number: 5,276,750
[45] Date of Patent: Jan. 4, 1994

[54] CONNECTORS HAVING TRANSLATIONAL AND ROTATIONAL COMPLIANCE ABOUT THE LEADING EDGE

[75] Inventor: Randy M. Manning, New Cumberland, Pa.

[73] Assignee: The Whitaker Corporation, Wilmington, Del.

[21] Appl. No.: 42,029

[22] Filed: Apr. 2, 1993

[51] Int. Cl.[5] .......................... G02B 6/00; G02B 6/36
[52] U.S. Cl. ..................................... 385/56
[58] Field of Search .................. 385/51, 53, 56, 60, 385/61, 63, 69, 75, 76, 88; 439/374, 377, 378

[56] References Cited

U.S. PATENT DOCUMENTS

| | | | |
|---|---|---|---|
| 4,877,302 | 10/1989 | Schürmann et al. | 385/56 |
| 4,890,894 | 1/1990 | Kwa | 385/56 |
| 4,953,929 | 9/1990 | Basista et al. | 350/96.2 |
| 5,121,454 | 6/1992 | Iwano et al. | 385/56 X |
| 5,125,849 | 6/1992 | Briggs et al. | 439/378 |
| 5,138,680 | 8/1992 | Briggs et al. | 385/60 |
| 5,157,749 | 10/1992 | Briggs et al. | 385/56 X |

OTHER PUBLICATIONS

"Using Compliance In Lieu of Sensory Feedback For Automatic Assembly" (1977), Doctor of Science Thesis by Samuel Hunt Drake of M.I.T., Cambridge, Mass.

*Primary Examiner*—Akm E. Ullah
*Attorney, Agent, or Firm*—Driscoll A. Nina, Jr.

[57] ABSTRACT

A self-aligning connector mechanism for electrical or optical connectors having an elongate member with a first end for mating with a coupling member, and a second end having a curved surface. A base member comprising a curved surface mates with the curved surface of the elongate member. The curved surface of the elongate member is slidably movable with respect to said curved surface of the base member, such that the slidable movement of the curved surface of the elongate member pivots the elongate member and the pivot point of said movement is located at the first end of the elongate member to provide rotational alignment. Lateral movement of the elongate member to provide translational alignment is enabled by planar surfaces in the base member on which the elongate member can slide sideways.

17 Claims, 7 Drawing Sheets

CONNECTORS HAVING TRANSLATIONAL AND ROTATIONAL COMPLIANCE ABOUT THE LEADING EDGE

FIELD OF THE INVENTION

The present invention is directed to alignment mechanisms, in particular self-aligning mechanisms suited for fiber optic connectors or electrical connectors.

BACKGROUND OF THE INVENTION

Connectors of numerous types have been widely used in a variety of applications including machinery, electronics, and fiber optics. Typical connectors comprise a male member forming a first connector member which inserts into or mates with a female member forming a second connector member.

Many applications require extremely close tolerances between connecting members. This is particularly true of fiber optic connectors. Fiber optic connectors typically comprise two connector halves. Each half contains a connector portion, typically either a plug or a receptacle, which is used for aligning mating optical fibers or an optical fiber to an electro-optic device. The plug and receptacle have a common axis along which the fiber optic signal is transmitted. When the connector portions are misaligned, the axis of the plug relative the axis of the receptacle is offset, resulting in signal attenuation or elimination.

In prior art connectors, the connector portions are typically joined to the connector half in cantilever fashion at points located farthest away from the mating point. Thus, if one of the connector portions is misaligned, the misalignment can only be corrected by pivoting of at least one of the portions at the point farthest from the mating junction. This results in the greatest bending moment being applied against the sidewalls connector portions. This can result in bending or distortion of the members.

Compliant structures provide for the automatic correction of misaligned structures without the need for feedback. See "Using Compliance In Lieu of Sensory Feedback For Automatic Assembly" (1977), Doctor of Science Thesis by Samuel Hunt Drake of M.I.T., Cambridge, Mass., which illustrates the use of self correcting compliant structures in mechanical systems. Drake discloses the use of such structures in manipulators used in the assembly of an alternator and power tools.

U.S. Pat. No. 5,125,849, entitled "Connector Guide Means", assigned to AMP Incorporated, assignee of the present invention, discloses a connector guide means for a fiber optic connector. This patent illustrates an electronic package which includes a mounting structure which may comprise a printed circuit board carrying circuit traces to electronic components such as logic and memory devices. The device includes a connector half having a pair of signal ports suitably interconnected to components which convert optical to electrical signals and electrical to optical signals. The optical signal ports disclosed in the '849 patent are not self correcting if misaligned.

It would be desirable to provide a self-aligning connector or device which could be connected to another connector or device. Such a self-aligning connector could function to correct for connector portion misalignment, thereby assuring signal transmission with a minimum of attenuation and stress imposed on the connector components. It would be further desirable to provide a self-aligning device which can eliminate translational and angular errors that occur during mating of connectors. Such a self-aligning mechanism could be adapted for a wide variety of applications including use in electrical and fiber optic connector systems.

SUMMARY OF THE INVENTION

In accordance with the present invention, an alignment mechanism is disclosed. It is an object of the present invention to provide an alignment mechanism that is useful for both electrical and optical connectors. It is a feature of this invention that the elongate member of the connector pivots and translates about its leading edge in a defined manner for aligning with a mating component.

In a first embodiment, the present invention is directed to an alignment mechanism for aligning a first and a second mating connector portions comprising: a first connector portion having an elongate member comprising a first end for mating with the second connector portion, and a second end having a curved surface; and a base member comprising a complimentarily curved surface for mating with said curved surface of said elongate member, said curved surface of said elongate member being slidably movable with respect to said curved surface of said base member, such that the slidable movement of said first curved surface pivots said elongate member, and the pivot point of said movement is ideally located at the first end of said elongate member, thereby providing rotational compliance to the elongate member. The base member also has a planar surface which mates with a second planar surface in a connector housing, the planar surface of the base member being slidably moveable with respect to the planar surface of the housing, such that the slidable movement provides translational compliance to the base member and in turn the elongate member.

In another embodiment, the present invention comprises an alignment mechanism adapted for aligning first and second mating connector portions comprising: a first connector portion having a cylindrical member aligned in a first axial direction and comprising a first end for slidably mating with the second connector portion, and a second end comprising a curved surface, a base member comprising a curved surface for mating with the curved surface of said cylindrical member, said curved surface of said base member being in substantial axial alignment with the first curved surface of said cylindrical member, and being of opposite complimentary curvature, said curved surface of said cylindrical member being slidably movable relative to said curved surface of said base member such that said movement pivots said cylindrical member, with the pivot point of said slidable movement being ideally located at said first end of said cylindrical member, whereby said cylindrical member may be realigned by said movement to a second angular direction. Furthermore, said base member also has a planar surface that mates with a second planar surface on a connector housing, the planar surface of the base member being slidably movable with respect to the planar surface of the housing such that the base member is free to translate so that the cylindrical member which mates with the base may also translate with the base member, whereby the cylindrical member may be realigned by the translational movement to a second axial position.

In still another aspect, the present invention is directed to a self-aligning fiber optic connector comprising: a first connector housing coupled to a first fiber optic device; a second connector housing coupled to a second fiber optic device and being slidably matable with said first connector housing; a first connector portion, such as a cylindrical ferrule or a receptacle, affixed to said first connector housing and being aligned in a first axial position, said first connector portion having a first end and a second end, the second end of said first connector portion comprising a first curved surface, said first connector portion having an axial bore for the transmission of a fiber optic light signal between said first and second fiber optic devices; a second connector portion affixed to said second connector housing, said second connector portion being in substantial axial alignment with said axial bore of said first connector portion, and being adapted to mate with said first connector portion; an annular ring having a planar surface in slidable contact with a planar surface of said first connector housing and having a second curved surface in substantial axial alignment with said first curved surface and said bore, said first curved surface of said first connector portion being in slidable rotational and translational relation to said second curved surface of said annular ring such that the first connector portion pivots and the pivot point of said rotational movement is located at the first end of said first connector portion. Said sliding movement is initiated by forces on the sides of said first connector portion, whereby when said first connector portion is slidably mated with said second connector portion, and, if the first connector portion is not angularly aligned with said second connector portion, forces acting against the sides of said first connector portion cause said first curved surface of said first connector portion to slidably move over said second curved surface and the first connector member to realign about said pivot point. The planar surfaces of the annular ring and housing allow for translational movement of first connector portion and base with respect to the housing.

These and other advantages of the present invention will become apparent from the detailed description claims which follow.

DESCRIPTION OF THE DRAWINGS

The present invention is described with reference to the enclosed Figures. It is to be appreciated that the enclosed Figures are merely illustrative of a preferred embodiment and that other instrumentalities may fall within the scope of the present invention.

DETAILED DESCRIPTION OF THE INVENTION

Figure 1:
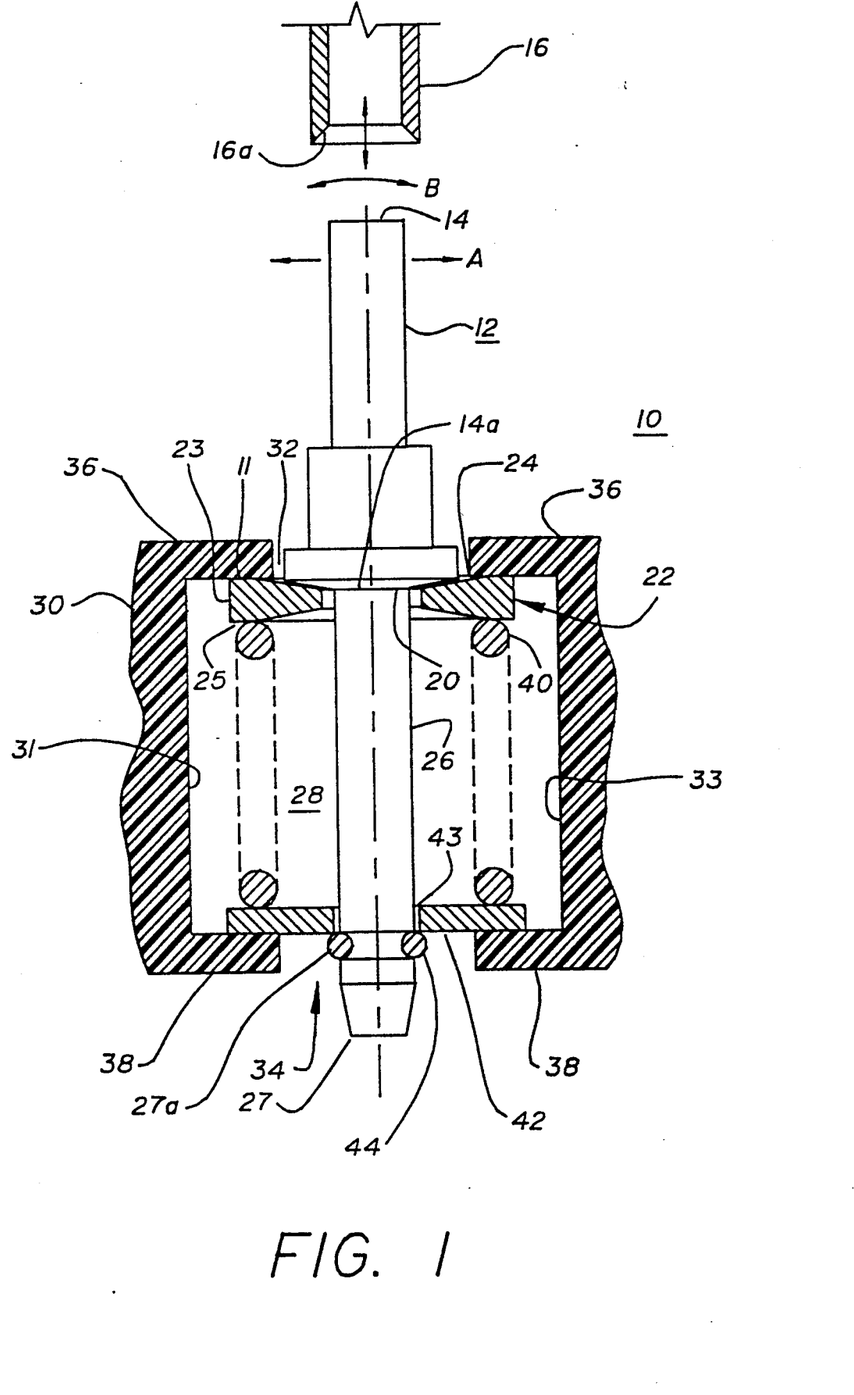
FIG. 1 is a sectional view of a first embodiment of an alignment mechanism in accordance with the present invention.

Referring to FIG. 1, a first embodiment of a self-aligning mechanism 10 in accordance with the present invention is shown. In the first embodiment, the alignment mechanism 10 comprises a first connector portion having an elongate member 12 having a first end 14 for mating with a second connector portion 16 having chamfered sidewalls 16a, and a second end 14a comprising a curved surface 20. The elongate member 12 may comprise one member of an electrical, optical or mechanical coupler, connector or implement for connecting with second connector portion 16 comprising the opposing member with which the elongate member 12 is to be slidably mated. In the embodiment shown in FIG. 1, the elongate member 12 is illustrated as having a cylindrical circumference. It is to be appreciated by those skilled in the art that the circumference of the elongate member 12 may have other geometric shapes and configurations. In addition, the elongate member 12 of FIG. 1 is shown as being a male member. It is to be noted that the elongate member 12 could be a female member with the second connector portion 16 being the male member.

A base member 22 having sidewalls 23 and comprising a curved major surface 24 and second major surface 25 mates with the curved surface 20 of elongate member 12. Curved surface 20 is of opposing curvature to surface 24. As shown in the exemplary embodiment of FIG. 1, curved surface 20 is of convex curvature, and curved surface 24 is of concave curvature. Base member 22 may comprise an annular ring or washer having a first radial surface which is in substantial axial alignment with the curved surface 20 of elongate member 12. The curved surface 20 of the elongate member 12 mates with and is in slidable relation with the curved surface 24 of the base member 22. The slidable movement of the curved surface 20 with respect to the curved surface 24 pivots the elongate member 12. The pivot point of movement is preferably located at the center of first end 14 of elongate member 12. In the embodiment shown in FIG. 1, the elongate member 12 includes a second elongate portion 26 having a terminal end 27. The second elongate portion 26 extends axially from the curved surface 20 in the direction opposite to that of elongate member 12. As shown in FIG. 1, second elongate portion 26 extends into the cavity 28 of a housing 30 having sidewalls 31, 33 and first and second openings 32, 34. Openings 32, 34 are created by horizontal wall sections 36, 38 of the housing 30. In the embodiment disclosed in FIG. 1, base member 22 is slidably secured against horizontal wall 36 of the cavity 28 by a biasing means 40 shown in a preferred embodiment as a biasing spring. It would be within the envisioned scope of the invention to have the base member 22 slidably secured against the horizontal wall 38 of the cavity 28 by a biasing spring 40 and the curved surface 20 of the elongate member 12 to be in slidable relation with the curved surface 24 of the base member 22. This embodiment further provides for an open space between the sidewalls 23 and the vertical ends of horizontal walls 36 of the housing, between which the base member 22 may translate laterally.

The biasing spring 40 is retained between second major surface 25 of the base member 22 and ring 42 proximate to the second horizontal wall 38 of the cavity 28. The elongate member 26 extends axially through an aperture 43 in the annular ring 42. Aperture 43 defines a free space between the side surface of end 27 and the inner wall of ring 42, between which end 27 may translate. It is also within the envisioned scope of the invention to minimize the aperture 43 to what is required to provide for the free angular rotation of the second elongate portion 26 and have the second elongate portion 26 translate with the annular ring 42 along second horizontal wall 38. The end 27 of the elongate member 26 is retained in position by a locking means 44; in a preferred embodiment, the locking means comprises a retaining ring which resides in a groove 27a cut in the elongate member 26.

The spring force of the compressed biasing spring 40 generates a frictional force between curved surfaces 20 and 24. By selecting biasing springs 40 having various spring tensions, the frictional force between the surfaces 20 and 24 may be adjusted. In addition, in fiber optic connectors the spring tensions may also be selected based on providing some required amount of biasing force between the mating fiber optic devices. In operation, the curved surface 20 of the elongate member 12 is slidably movable with respect to the curved surface 24 of base member 22 to provide angular motion of member 12 with respect to member 16, as shown by arrows B in FIG. 1. The movement may also be translational with respect to the coupling member 16 by lateral sliding of base member 22 on surface 11 with respect to walls 36, as shown by arrows A. The slidable movement of the first curved surface 20 with respect to the second curved or angled surface 24 pivots the elongate member 12. The pivot point of the movement is located at or near the center of the first end 14 of the elongate member 12. The angular and translational movement of the elongate member 12 aligns it with the coupling member 16.

Figure 4:
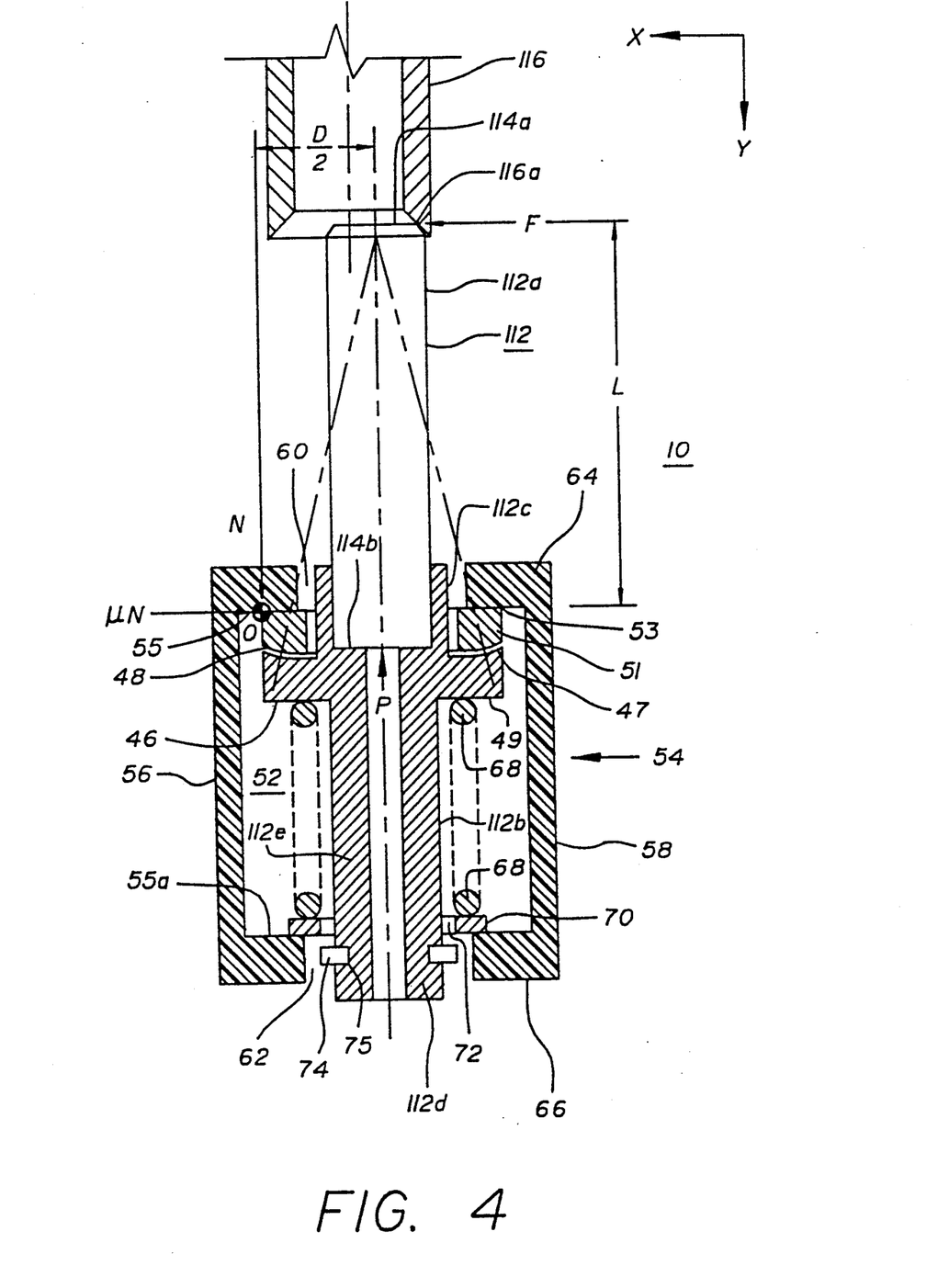
FIG. 4 is a sectional view of a second embodiment of a self-alignment mechanism in accordance with present the invention which illustrates the transverse forces on the device.
Figure 5:
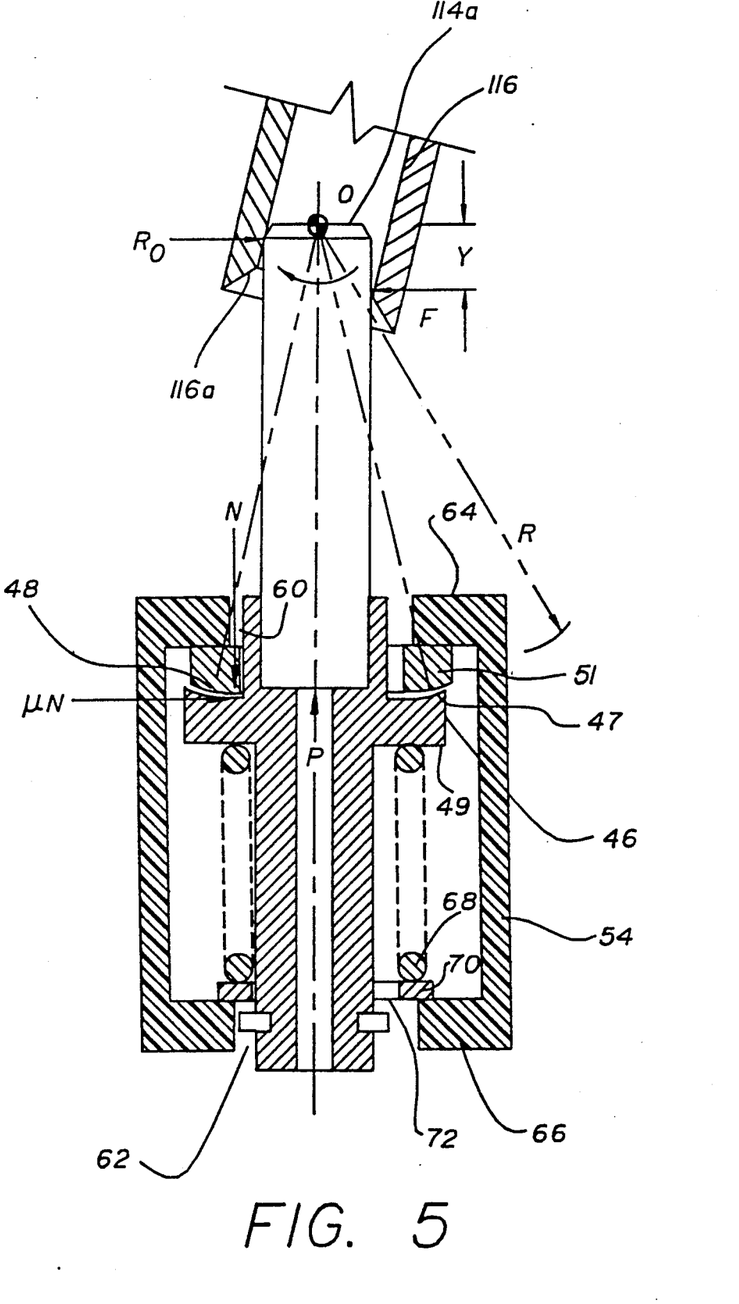
FIG. 5 is a sectional view of the second embodiment of the self-alignment mechanism in accordance with the present invention which illustrates the rotational forces on the device.

Referring now to FIGS. 4 and 5, another preferred embodiment of the present invention is now described. In this embodiment, alignment mechanism 10 comprises an elongate member 112 aligned in a first axial position. Elongate member 112 comprises two elongate member sections 112a, 112b. First elongate member 112a is preferably cylindrical about its circumference and has a first end 114a and a second end 114b. The second elongate member 112b preferably comprises a hollow mating cylindrical casing portion 112c, coaxial with member 112b, and a second cylindrical member 112e having a terminal end 112d. Second end 114b is joined to the first cylindrical casing portion 112c. Below the point where second end 114b and portion 112c join, elongate member section 112b comprises a coaxial ridge 46 which defines a first curved surface, examplatorily shown as concave radial surface 47, which faces axially toward the first end 114a, and a second flat radial surface 49. It is also possible to have an elongate member 112 of unitary construction. The concave radial surface 47 mates with the second curved surface having a complimentarily curved surface shown as convex radial surface 48 of base member comprising an annular ring 51. The second radial surface 53 of annular ring 51 is planar.

The embodiment of FIGS. 4 and 5 includes a housing 54 surrounding a cavity 52. The housing 54 supports the alignment mechanism. The housing 54 includes sidewalls 56, 58 and first and second openings 60, 62. Openings 60, 62 are cut into horizontal walls 64, 66 of the housing 54. In the embodiment disclosed in FIGS. 4 and FIG. 5, radial surface 49 is biased upwardly by a biasing means 68 shown in this preferred embodiment as a spring. The biasing spring 68 is retained between radial surface 49 and an annular ring 70 having a central aperture 72 proximate to the lower horizontal wall 66 of the housing 54. The annular ring 70 and annular ring 51 are slidably located within the housing surfaces 55, 55a.

The lower terminal end of second elongate member 112d extends axially through aperture 72 in the annular ring 70, and is held in position by a locking means 74. In this embodiment, the locking means 74 comprises a snap-ring embedded in a groove 75 cut into the terminal end of elongate member 112d.

As in the embodiment of FIG. 1, the spring tension force of biasing spring 68 generates a frictional force between surfaces 47 and 48. In operation, the concave surface 47 of the radial ridge 46 is slidably movable relative to the convex surface 48 of the base member such that the movement of this concave surface pivots the elongate member 112. The pivot point of said movement is preferably located at the center of the uppermost end of the elongate member. Thus, the elongate member 112 pivots at a location closest to the point of mating. The planer surface 53 of the base member 51 is slidably moveable relative to the planer surface 55 of the housing 54 such that said base member 51 and in turn the elongate member 112 translate relative to said connector housing 54. The lower terminal end of elongate member 112d moves laterally within a space 72 provided by the annular ring 70. Accordingly, the elongate member 112 may be realigned to a second axial position by angular and lateral translational motion.

FIGS. 4 and 5 further illustrate the force components which function to pivot and realign the alignment mechanism of the present invention. The Y axis of the figures is coaxial with the axis of the bores of the first and second connector portions through which the optical signal is transmitted. The X axis is perpendicular to the Y axis. Thus FIGS. 4 and 5 illustrate, respectively, the forces working in the X, Y and rotational (angular) directions under situations in which the alignment mechanism is translationally and angularly misaligned with respect to the axis of the second coupling member.

Figure 2:
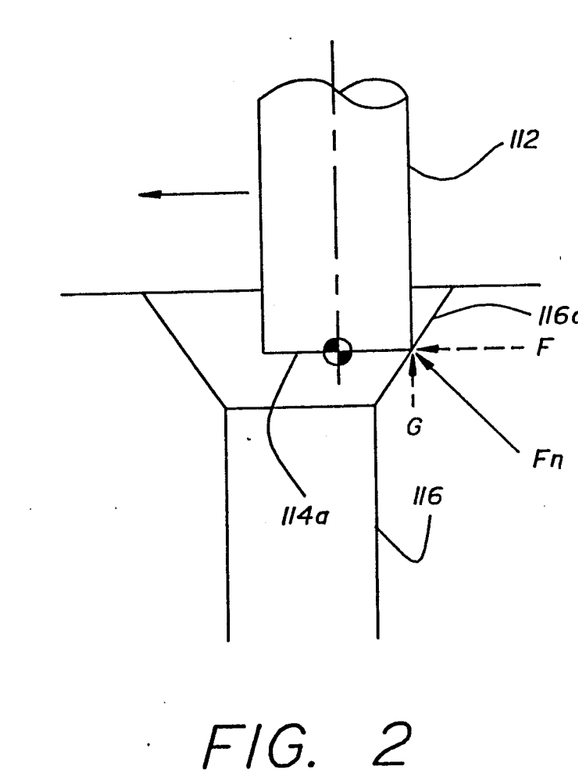
FIGS. 2 and 3 illustrate respective translationally and rotationally misaligned couplers.
Figure 3:
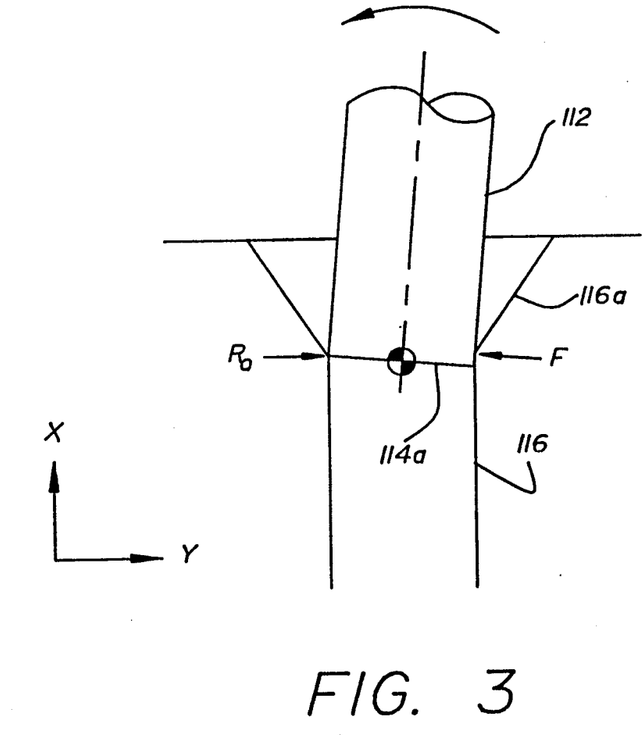

The force components arise in two scenarios as shown in FIGS. 2 and 3. The first scenario is one in which the elongate member 112 is translationally misaligned with respect to member 116 as shown in FIG. 2. The second scenario arises when the elongate member 112 is rotationally or angularly misaligned with respect to member 116 as shown in FIG. 3. Both Figures assume that the alignment mechanism of the present invention is an elongate member 112 to be inserted within a second coupler 116 in which the second coupler has a chamfered surface 116a for slidably inserting the two members together. However, the chamfered surface may also be on elongate member 112 instead of coupler 116 or a chamfered surface may be on both members 112 and 116.

Referring first to FIGS. 2 and 4 and the problem of translational misalignment, as the first end 114a of elongate member 112 enters the second member 116, the edge of the first member strikes the chamfered surface 116a of the second member. A force (Fn) normal to the point of contact on the second member 116a is applied to the first member 112. This force is resolved into a component (G) acting along the Y axis of the elongate member 112 and a component (F) acting along the X axis of the elongate member 112, according to the following equations:

$$\Sigma Fy = N - P = 0$$

$$N = P$$

$$\Sigma Fx = F - \mu N = 0$$

$$F = \mu N$$

$$\Sigma Mo = FL - P D/2 = 0$$

$$FL > PD/2$$

$$F = \mu P$$

$$\mu = D/2L \text{ tipping}$$

$$\mu < D/2L \text{ sliding,}$$

where $\Sigma Mo$ is the sum of the moments; $\Sigma Fy$ is the sum of the force components in the y direction; $\Sigma Fx$ is the sum of the force components in the X direction; $\mu$ is the coefficient of friction; N is the normal force; and P is the force of the biasing spring.

A frictional force $\mu N$ is present between the planar surfaces 53, 55. This frictional force is a function of the spring force P supplied by a spring 68 which opposes the normal force N. This force is a transverse force.

In operation, if the resulting transverse force F, which arises when the translationally misaligned elongate member 112 strikes the chamfered surface 116a, is greater than the frictional force $\mu N$ between the two planar surfaces 53 and 55, the elongate member 112 will translate until the edge of the elongate member and the edge of member 116 are aligned. The translational misalignment between the members is thereby eliminated. It is to be noted that while the curved surfaces 47, 48 and the planer surfaces 53,55 (shown in FIG. 4) may be constructed from a variety of materials, the coefficient of friction between the members should be less than the diameter of the annular ridge 46, or the base member, divided by two times the length from end 114a to surface 53, or the surface 48, of the annular ring. If the coefficient of friction is greater than this value, the elongate member 112 will tip rather than slide.

Referring now to the problem of rotational or angular misalignment, as shown in FIGS. 3 and 5, as the elongate member 112 is inserted within the coupling member 116, if an angular or rotational misalignment exist, forces arise which are governed by the following equations:

$$\Sigma Fy = N - P = 0$$

$$N = P$$

$$\Sigma Fx = F - Ro - \mu N = 0$$

$$F = Ro - \mu N$$

$$\Sigma Mo = FY - \mu PR = 0$$

$$FY > \mu PR$$

$$\mu < FY/PR$$

where $\Sigma Mo$ is the sum of the moments; $\Sigma Fy$ is the force component in the y direction; $\Sigma Fx$ is the sum of the force component in the X direction; $\mu$ is the coefficient of friction; N is the normal force; P is the force of the biasing spring; Ro is a reaction force acting in a direction opposite to F; R is the effective spherical radius of curvature of surfaces 47 and 48; and Y is the length of the moment arm.

As shown in FIG. 3, F and Ro produce two opposing forces which are displaced from each other along the axis of the first member and, by summing movements about point 0, define moment FY. If the resulting moment FY is greater than the opposing moment caused by the frictional force ($\mu N$) between the two curved surfaces times the radius R, the elongate member 112 will rotate about the center of rotation 0 located at the end 114a of the elongate member. The rotation will continue until any angular error is reduced to zero and the moment no longer exists. The structure of the present invention is therefore able to eliminate both translational and angular errors from the mating parts. As with the case of translational misalignment, with respect to angular misalignment, the choice of materials for the curved surfaces is preferably such that the coefficient of friction $\mu$ is less than the product of the force F times Y divided by the radius of curvature R times the spring force P.

The self-aligning mechanism 10 of the present invention may be utilized to correct translational and rotational misalignments in a wide variety of applications requiring the mating or coupling of two members. Such applications include, but are not limited to, use in electrical connectors, mechanical connectors and optical connectors. It will be appreciated by those skilled in the art, that the self-alignment mechanism of the present invention may be used in any application in which one member must be mated with another, and in which rotation or translation misalignment could prove problematic, and must be corrected.

Figure 6:
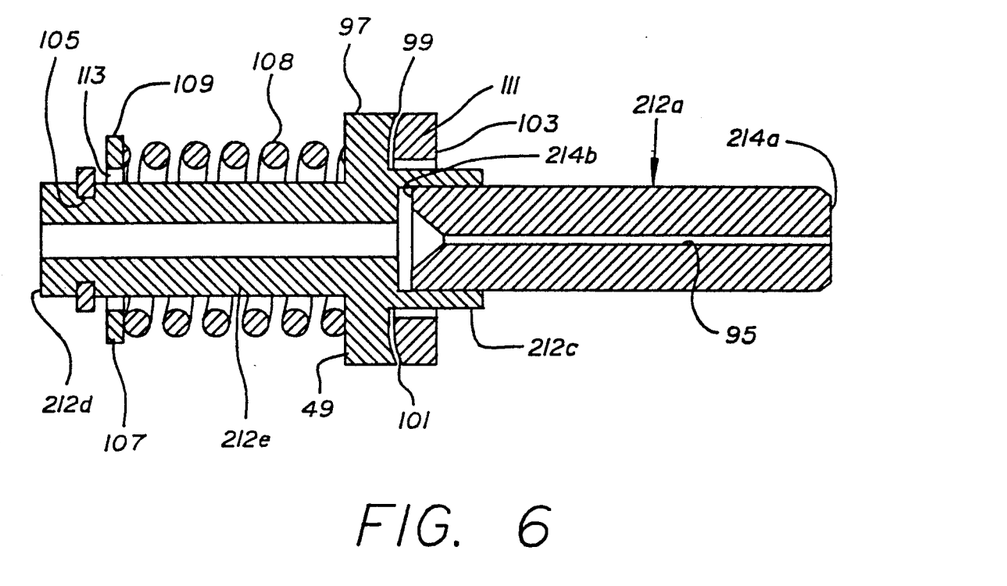
FIG. 6 is a sectional view of a fiber optic ferrule in accordance with the present invention.
Figure 7:
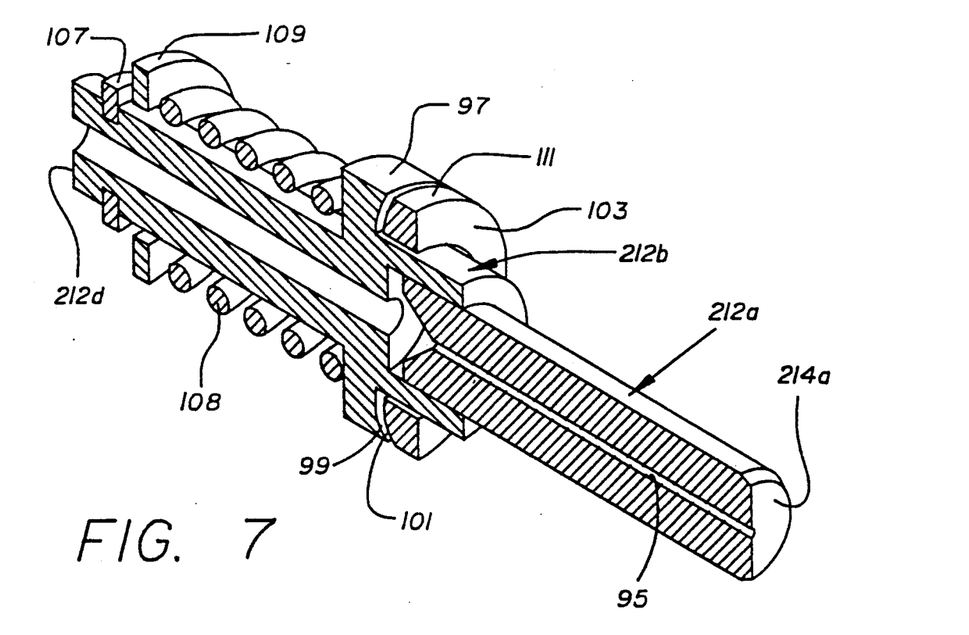
FIG. 7 is an isometric view of the fiber optic ferrule of FIG. 6.
Figure 8:
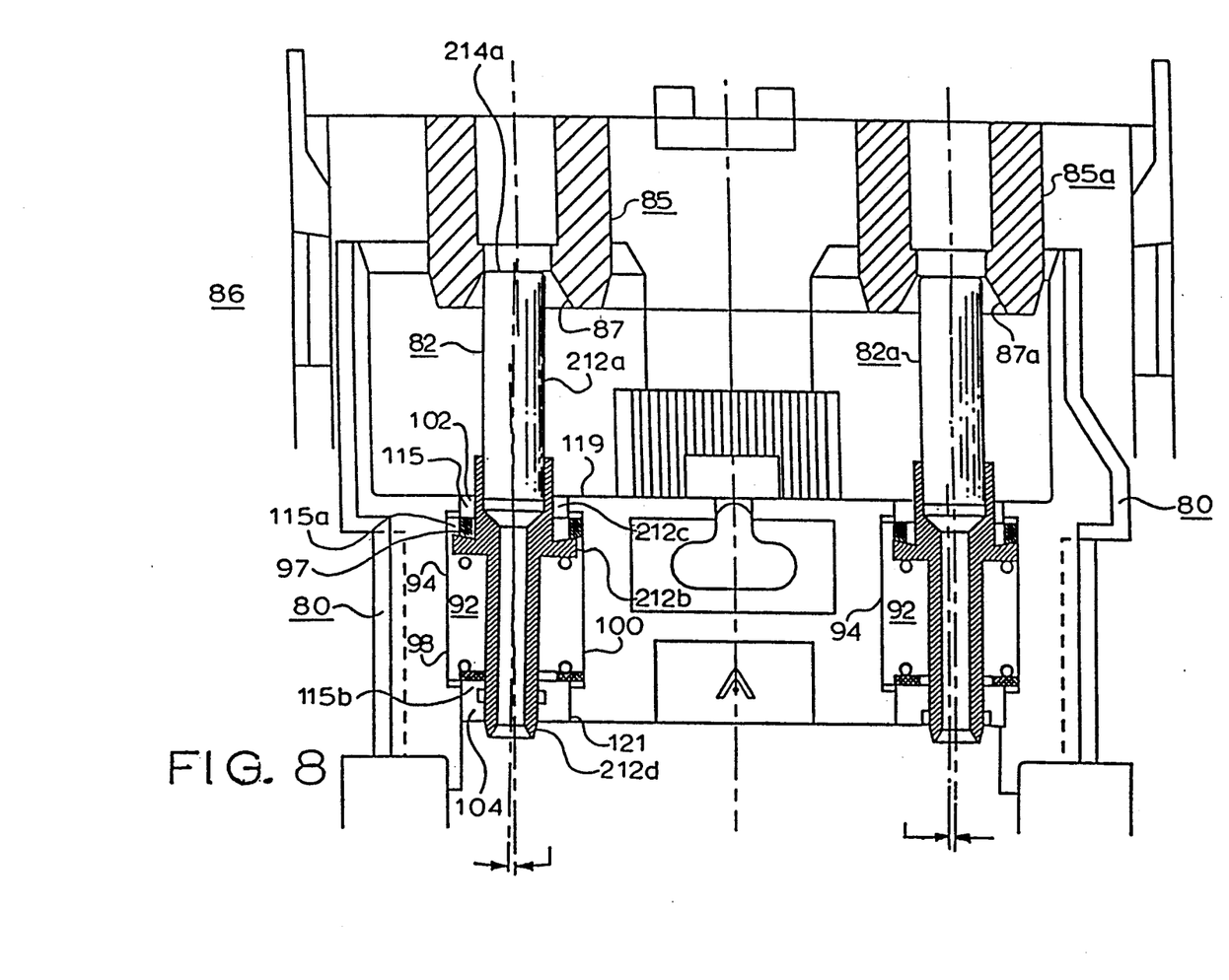
FIG. 8 is an isolated view of the two pieces of the connector housing of a fiber optic connector in accordance with the present invention, joining together.
Figure 9:
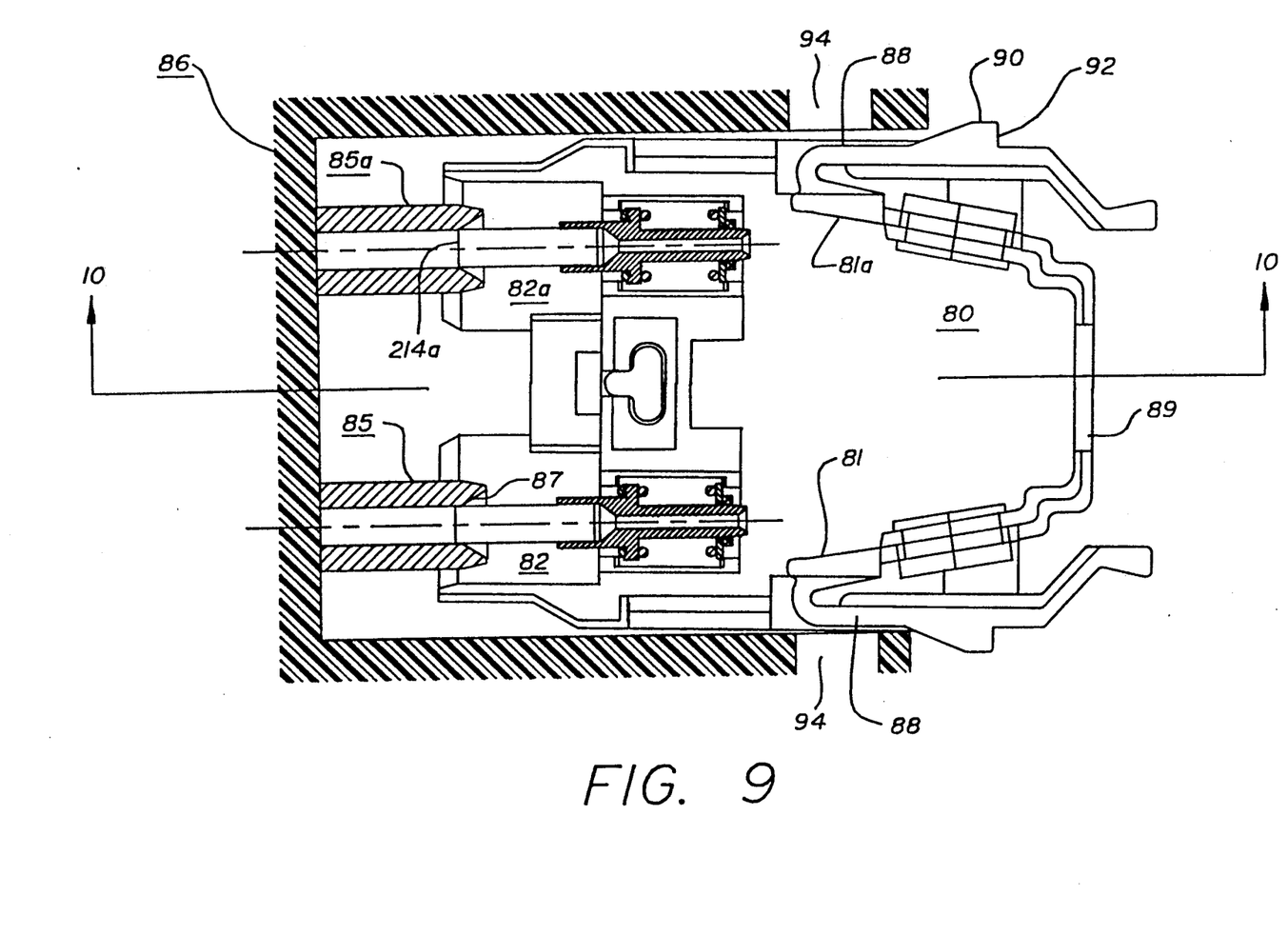
FIG. 9 is an underside view of a first fiber optic connector housing being coupled with a second fiber optic connector housing.

The present invention is now described in another preferred embodiment with reference to FIGS. 6-9. In this embodiment, the alignment mechanism of the present invention is incorporated into a self-aligning fiber optic connector half. Referring to FIGS. 8 and 9, the self-aligning fiber optic mechanism of this embodiment forms part of a first connector housing 80 having a pair of signal ports 82 and 82a that terminate optical fibers which are interconnected to components which in turn convert optical to electrical signals (not shown). A second connector half is housing 86 having a pair of female ports 85, 85a connected to coupling components which convert optical signals to electrical signals. The female ports 85, 85a have chamfered sidewalls 87 and 87a which mate with signal ports 82, 82a. The remote end 89 of first connector housing 80 will typically be affixed to another connector half or a fiber optic transducer (not shown) by a fiber optic cable. Although the second connector housing 86 is shown as the front portion of a fiber optic transducer, the second connector housing could be attached to another fiber optic cable or any other type of optical component.

Referring now to FIG. 9, each of the sides 81 and 81a of the first connector of housing 80 contains a means 88 for connecting the first and second housings 80 and 86 together. In a preferred embodiment, means 88 comprise resilient u-shaped clamps 90 having protrusions 92 which insert into two slots 94 of the second connector housing 86. As shown in FIGS. 8 and 9, the first housing 80 slidably mates with the second housing 86 and is locked in place by clamps 90.

Referring to FIGS. 6 and 7, in the embodiment of FIGS. 6-9, the first connector portions are signal ports 82 82a comprise elongate ferrule members 212, each comprising two matable elongate cylindrical ferrule sections 212a, 212b. Ferrule section 212a is preferably cylindrical in circumference and has a first end 214a and a second end 214b. The end 214a slidably mates within second connector portions that are chamfered hollow cylindrical female ports 85,85a (FIG. 9) which are integral with the second housing 86. The size of the chamfer is selected to encompass the area in which the envisioned misaligned signal port 82,82a may lie. As mentioned above, while the ferrule section 212a and 212b are described as being cylindrical in circumference this is not meant to be limiting and it is within the envisioned scope of the invention for the signal ports 82,82a to be female members while the signal ports 85,85a are the male members. The configuration set forth is meant to be examplatory only. The cylindrical first ferrule portion 212a has a central bore 95 that contains an optical fiber for transmitting a fiber optic signal. The second ferrule portion 212b, as shown, comprises a hollow coaxial casing portion 212c into which the second end 214b of first ferrule portion 212a is joined, and a second hollow cylindrical elongate housing portion 212e. Beyond where end 214b and hollow coaxial casing 212c mate, ferrule portion 212b comprises a coaxial ridge 97 defining a concave radial surface 99 which faces the first end 214a. The concave radial surface 99 mates with the convex radial surface 101 of a base member, shown in this embodiment as an annular ring 111. Annular ring 111 has a second radial planar surface 103. Upon comparison of FIGS. 1 and 4, it will be apparent that there are various configurations of concave and convex surfaces within the spirit of the present invention. It should also be apparent that while the concave surface is discussed as being spherical this is not meant to be limiting, for example the surface could also be a concave conical surface. The terminal end of ferrule portion 212d includes a groove 105 in which is embedded a second annular ring 107. The annular ring 107 further supports a washer 109. The second elongate member portion 212d extends axially through an aperture 113 in the annular ring 107.

In FIGS. 2-9, a casing spring 108 maintains the coaxial ridge 97 in frictional engagement against the annular ring 111. Casing spring 108 is retained between the second radial surface 49 of the and coaxial ridge 97 and washer 109. Casing spring 108 provides a biasing force which creates a frictional force between surfaces 99 and 101 when the planar radial surface 103 is supported by housing surface 55.

Referring now to FIG. 8, the ferrule portions 212a, 212b are each situated within one of two housing portions 94 within first housing 80, each having a central cavity 92 formed by sidewalls 98 and 100. Each housing portion 94 includes sidewalls 98 and 100 and first and second openings 102 and 104. Openings 102 and 104 are cut into horizontal walls 119 and 121 of each housing 94 portion. Cylindrical casing portions 212c are retained at openings 102. There is a free space 115 between the cylindrical casing 212c and the adjacent horizontal wall, and there is a second free space 115a between the horizontal sidewall of member 212b and the outside wall of annular ring 97. Finally, there is free space 115b between terminal end of the ferrule portion 212d and sidewall 121. The free spaces 115, 115a and 115b permit the ferrule 212 to shift laterally as shown in FIG. 8.

Referring now to FIGS. 8 and 9, the operation of the alignment system will now be described. As the two connector housings 80,86 are slid together, the first end of the ferrule coupler 214a is inserted into the chamfered surface 87 of the second coupling member 85 attached to the second housing 86. If the ferrule is misaligned either in a translational or rotational direction, the ferrule moves, both rotationally and translationally as required at the first end 214a of the ferrule, as shown illustratively in FIGS. 4 and 5. A frictional force $\mu N$ acts between the planer surfaces 53 and 55, as shown in FIG. 4. The frictional force is generated by casing spring 68 which applies a force P opposing the normal force (N). If the transverse force Fx, is greater than the resulting frictional force between the two planar surfaces 53 and 55, the ferrule 212 will translate until the first end 214a of ferrule member 212a and the corresponding edge of the second member are aligned. The translational misalignment between the coupling member 82 and the second coupling member 85 is thereby corrected.

If the ferrule member 212 is rotationally misaligned, two opposing forces, slightly displaced from each other along the axis of the first ferrule member, create a moment at the end of the ferrule member 214a. If the resulting moment is greater than the opposing moment caused by the frictional force between the two curved surfaces 47,48, the ferrule 212 will rotate about a center of rotation located at the end 214a of the first coupling member. The rotation will continue until any angular error is reduced to zero and the moment no longer exists. This structure is therefore able to eliminate both translation and rotational misalignment. In the representative example shown in FIG. 8 which illustrates a preferred optical coupler, the ferrule 212 can rotate 1 degree, twelve minutes and translate 0.010 inches about its central axis.

The present invention has been described with reference to the above discussed embodiments. It is to be appreciated that other embodiments may fulfill the spirit and scope of the present invention and that the true spirit and scope of the present invention is to be determined with reference to the claims appended hereto.

I claim:

1. A self-aligning first connector housing portion adapted to mate with a second connector housing portion comprising:

an elongate member comprising a first end for mating with the second connector portion, and a second end comprising a first curved surface; and a base member comprising a second curved surface for mating with said first curved surface of said elongate member, said first curved surface of said elongate member being slidably movable with respect to said second curved surface of said base member, such that the slidable movement of said first curved surface pivots said elongate member, about a pivot point located at about the first end of said elongate member; and a support on one of the connector housing for mounting said base member, supporting said base member for lateral slidable motion with respect to said support, whereby said elongate member moves rotationally and translationally to accommodate misalignment between the first connector portion and the second connector portion.

2. The self-aligning connector portion of claim 1, wherein said elongate member is a cylindrical member and said second connector portion is a coaxial cylindrical member.

3. The self-aligning connector portion of claim 1, wherein said elongate member is a fiber optic ferrule and the coupling member is a hollow coaxial fiber optic connector to be joined with said fiber optic ferrule.

4. The self-aligning connector portion of claim 1, wherein one of the curved surfaces is concave and the other is convex.

5. The self-aligning connector portion of claim 4, wherein said concave surface is conical.

6. A self-aligning fiber optic connector optically coupled to a fiber optic device and being matable to a second connector housing for transmitting a fiber optic signal between two fiber optic devices, said second connector housing being optically coupled to the other fiber optic device and having a second connector portion with chamfered sidewalls affixed to said second connector housing, said second connector portion being aligned in a first axial position, comprising:
   a first connector housing;
   a first connector portion affixed to said first connector housing and being in substantial axial alignment with said second connector portion when the first connector housing and the second connector housing are mated, said first connector portion comprising
      a first end, adapted to mate with the second connector portion;
      a second end having a first curved surface;
      an axial bore therebetween adapted for transmitting an optical signal therein; and
   an annular ring contained within said first connector housing and being in translationally slidable engagement therewith, said annular ring having a second curved surface being in substantial axial alignment with said first curved surface, said first curved surface of said first connector portion being in slidable engagement with the second curved surface of said annular ring which is in slidable engagement with the first connector housing such that the first connector portion slides translationally with respect to the first connector housing body and pivots rotationally, wherein the pivot point of said rotational movement is located at the first end of said first connector portion, said sliding movement being initiated by forces on the sides of the first connector portion,
   whereby when said first connector portion is mated with the second connector portion, if the first connector portion is not translationally or rotationally aligned with said second connector portion, forces against the walls of the first connector portion applied by said chamfered sidewalls cause said first curved surface of said first connector portion to slidably move over said second curved surface and the annular ring to move laterally in order for the first connector portion to realign.

7. The self-aligning fiber optic connector of claim 6, wherein the first curved surface and the second curved surface have a center of curvature located at the first end of the first connector portion.

8. The self-aligning fiber optic connector of claim 6, wherein the first curved surface is concave and the second curved surface is convex.

9. The self-aligning fiber optic connector of claim 6, wherein the first curved surface is convex and the second curved surface is concave.

10. The self-aligning fiber optic connector of claim 8, wherein the concave surface is frustoconical.

11. The self-aligning fiber optic connector of claim 9, wherein the concave surface is frustoconical.

12. The self-aligning fiber optic connector of claim 11 wherein said first and second curved surfaces are maintained in position by a biasing spring.

13. The self-aligning fiber optic connector of claim 12, wherein the annular ring is maintained in position with the first connector housing by the biasing spring.

14. The self-aligning fiber optic connector of claim 6, wherein an optical fiber is contained within the axial bore of the first connector portion.

15. The self-aligning fiber optic connector of claim 6, wherein the first connector portion is a fiber optic ferrule and the second connector portion is a hollow coaxial protrusion adapted to be in close sliding alignment with said ferrule.

16. The self-aligning fiber optic connector of claim 6, wherein the annular ring is plastic.

17. The self-aligning connector of claim 6, wherein the first curved surface and the second curved surface are complimentary.

* * * * *